United States Patent
Itoh et al.

(10) Patent No.: US 10,615,473 B2
(45) Date of Patent: Apr. 7, 2020

(54) POLARIZATION STANDING WAVE CAVITY ASSISTED BY ANISOTROPIC STRUCTURES

(71) Applicant: The Regents of the University of California, Oakland, CA (US)

(72) Inventors: Tatsuo Itoh, Oakland, CA (US); Xiaoqiang Li, Oakland, CA (US); Mohammad Memarian, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/996,176

(22) Filed: Jun. 1, 2018

(65) Prior Publication Data

US 2019/0013558 A1    Jan. 10, 2019

Related U.S. Application Data

(60) Provisional application No. 62/677,501, filed on May 29, 2018, provisional application No. 62/514,620, filed on Jun. 2, 2017.

(51) Int. Cl.
| | |
|---|---|
| *H01P 1/208* | (2006.01) |
| *H01P 3/127* | (2006.01) |
| *G02B 1/00* | (2006.01) |
| *H01P 7/10* | (2006.01) |

(52) U.S. Cl.
CPC ............ *H01P 1/2082* (2013.01); *G02B 1/002* (2013.01); *H01P 1/2086* (2013.01); *H01P 3/127* (2013.01); *H01P 7/10* (2013.01)

(58) Field of Classification Search
CPC ...... H01P 1/2086; H01P 3/127; H01P 1/2082; G02B 6/00

USPC .......................................................... 333/208
See application file for complete search history.

(56) References Cited

PUBLICATIONS

Plum et al. "Chiral Mirrors", Applied Physics Letter, vol. 106, No. 221901, 2015, pp. 1-5 (Year: 2015).*
Pressl et al., "Mode-resolved Fabry-Perot experiment in low-loss Bragg-reflection waveguides", Optical Society of America, Dec 28, 2015, vol. 23, No. 26, pp. 33608-33621 (Year: 2015).*
Aieta et al., "Out-of-Plane Reflection and Refraction of Light by Anisotropic Optical Antenna Metasurfaces with Phase Discontinuities", Nano Letters, Feb. 15, 2012, vol. 12, No. 3, pp. 1702-1706, doi: 10.1021/nl300204s.
Balanis, Constantine A., "Advanced Engineering Electromagnetics", John Wiley & Sons, Inc., Second Edition, 2012, 1046 pages. (Presented in 6 parts).
Bozzi et al., "Review of substrate-integrated waveguide circuits and antennas", IET Microwaves, Antennas & Propagation, vol. 5, Issue 8, Jun. 6, 2011, pp. 909-920.
Caloz et al., "CRLH metamaterial leaky-wave and resonant antennas", IEEE Antennas and Propagation Magazine, vol. 50, Issue 5, Oct. 2008, pp. 25-39.

(Continued)

*Primary Examiner* — Benny T Lee
*Assistant Examiner* — Hafizur Rahman
(74) *Attorney, Agent, or Firm* — KPPB LLP

(57) ABSTRACT

Waveguides in accordance with embodiments of the invention are disclosed. In one embodiment, a dual-mode circular waveguide includes a cavity, a first end wall including a first handedness-preserving metasurface positioned at a first end of the cavity, and a second end wall including a second handedness-preserving metasurface positioned at a second end of the cavity.

6 Claims, 6 Drawing Sheets

(56) References Cited

PUBLICATIONS

Chen et al., "Artificial perfect electric conductor-perfect magnetic conductor anisotropic metasurface for generating orbital angular momentum of microwave with nearly perfect conversion efficiency", Journal of Applied Physics, vol. 119, Issue 6, Article 064506, Feb. 2016, pp. 064506-1-064506-6.

Chen et al., "Substrate Integrated Waveguide Filter: Basic Design Rules and Fundamental Structure Features", IEEE Microwave Magazine, vol. 15, Issue 5, Jul.-Aug. 2014, pp. 108-116.

Collin, Robert E., "A Simple Artificial Anisotropic Dielectric Medium", IRE Transactions on Microwave Theory and Techniques, vol. 6, Issue 2, Apr. 1958, pp. 206-209.

Collin, Robert E., "Field theory of guided waves", McGraw-Hill Book Company Inc., 1960, 308 pages.

Engheta et al., "Mode orthogonality in chirowaveguides", IEEE Transactions on Microwave Theory and Techniques, vol. 38, Issue 11, Nov. 1990, pp. 1631-1634.

Fang et al., "Coherent control of light-matter interactions in polarization standing waves", Scientific Reports, vol. 6, Article 31141, Aug. 12, 2016 , pp. 1-7, DOI: 10.1038/srep31141.

Feresidis et al., "Artificial magnetic conductor surfaces and their application to low-profile high-gain planar antennas", IEEE Transactions on Antennas and Propagation, vol. 53, Issue 1, Jan. 2005, pp. 209-215.

Gough, Ryan C., "Self-Actuation of Liquid Metal via Redox Reaction", ACS Applied Materials & Interface, vol. 8, Issue 1, Dec. 22, 2015, pp. 6-10.

Hawthorn et al., "Littrow configuration tunable external cavity diode laser with fixed direction output beam", Review of Scientific Instruments, vol. 72, Issue 12, Dec. 2001, pp. 4477-4479.

He et al., "A Low Phase-Noise VCO Using an Electronically Tunable Substrate Integrated Waveguide Resonator", IEEE Transactions on Microwave Theory and Techniques, vol. 58, Issue 12, Dec. 2010, pp. 3452-3458.

Hou et al., "A High-Q Widely Tunable Gigahertz Electromagnetic Cavity Resonator", Journal of Microelectromechanical Systems, vol. 15, Issue 6, Dec. 4, 2006, pp. 1540-1545.

Humar et al., "Electrically tunable liquid crystal optical microresonators", Nature Photonics, vol. 3, Issue 10, Oct. 2009, pp. 595-600.

Itoh, Tatsuo, "Analysis of Microstrip Resonators", IEEE Transactions on Microwave Theory and Techniques, vol. 22, Issue 11, Nov. 1974, pp. 946-952.

Kern et al., "The design synthesis of multiband artificial magnetic conductors using high impedance frequency selective surfaces", IEEE Transactions on Antennas and Propagation, vol. 53, Issue 1, Jan. 2005, pp. 8-17.

Li et al., "A New Resonance in a Circular Waveguide Cavity Assisted by Anisotropic Metasurfaces", 2017 IEEE/MTT-S International Microwave Symposium—MTT 2017, Jun. 4-9, 2017, Hawaii Convention Center, Honolulu, HI, 3 pages.

Li et al., "Blazed metasurface grating: The planar equivalent of a sawtooth grating", 2016 IEEE MTT-S International Microwave Symposium (IMS), May 22-27, 2016, pp. 1-3.

Lin et al., "Microelectromechanical filters for signal processing", Journal of Microelectromechanical Systems, vol. 7, Issue 3, Sep. 1998, pp. 286-294.

Liu, "High-Q Tunable Microwave Cavity Resonators and Filters Using SOI-Based RF MEMS Tuners", Journal of Microelectromechanical Systems, vol. 19, Issue 4, Aug. 2010, pp. 774-784.

Liu et al., "Optical Magnetic Mirrors without Metals", Optica, vol. 1, No. 4, Oct. 2014, pp. 250-256.

Ma et al., "Realisation of magnetic conducting surface using novel photonic bandgap structure", Electronics Letters, vol. 34, Issue 21, Oct. 15, 1998, pp. 2041-2042.

Mansour, Raafat R. "High-Q tunable dielectric resonator filters", IEEE Microwave Magazine, vol. 10, Issue 6, Oct. 2009, pp. 84-98.

Memarian et al., "Quad-mode and dual-mode dielectric resonator filters", IEEE Transactions on Microwave Theory and Techniques, vol. 57, Issue 12, Dec. 2009, pp. 3418-3426.

Minatti et al., "A Circularly-Polarized Isoflux Antenna Based on Anisotropic Metasurface", IEEE Transactions on Antennas and Propagation, vol. 60, Issue 11, Nov. 2012, pp. 4998-5009.

Mosallaei et al., "Antenna miniaturization and bandwidth enhancement using a reactive impedance substrate", IEEE Transactions on Antennas and Propagation, vol. 52, Issue 9, Sep. 2004, pp. 2403-2414.

Nath et al., "An electronically tunable microstrip bandpass filter using thin-film Barium-Strontium-Titanate (BST) varactors", IEEE Transactions on Microwave Theory and Techniques, vol. 53, Issue 9, Sep. 2005, pp. 2707-2712.

Rostami et al., "Fabrication of optical magnetic mirrors using bent and mushroom-like carbon nanotubes", Carbon, vol. 48, Issue 13, Nov. 2010, pp. 3659-3666.

Sievenpiper et al., "High-impedance electromagnetic surfaces with a forbidden frequency band", IEEE Transactions on Microwave Theory and Techniques, vol. 47, Issue 11, Nov. 1999, pp. 2059-2074.

Uher et al., "Tunable microwave and millimeter-wave band-pass filters", IEEE Transactions on Microwave Theory and Techniques, vol. 39, Issue 4, Apr. 1991, pp. 643-653.

Wang et al., "High-order medium frequency micromechanical electronic filters", Journal of Microelectromechanical Systems, vol. 8, Issue 4, Dec. 1999, pp. 534-557.

Yan et al., "Tunable Dielectric Resonator Bandpass Filter With Embedded MEMS Tuning Elements", IEEE Transactions on Microwave Theory and Techniques, vol. 55, Issue 1, Jan. 2007, pp. 154-160.

Yang et al., "A novel TEM waveguide using uniplanar compact photonic-bandgap (UC-PBG) structure", IEEE Transactions on Microwave Theory and Techniques, vol. 47, Issue 11, Nov. 1999, pp. 2092-2098.

Zhao et al., "Twisted optical metamaterials for planarized ultrathin broadband circular polarizers", Nature Communications, vol. 3, Article 870, May 29, 2012, pp. 1-7.

Caloz et al., "Electromagnetic Metamaterials: Transmission Line Theory and Microwave Applications", John Wiley & Sons, Inc., 2006, 376 pages.

Harrington, Roger F., "Time-Harmonic Electromagnetic Fields", The IEEE Press Series on Electromagnetic Wave Theory, John Wiley & Sons, Inc., Sep. 2001, 496 pages.

Holloway et al., "Waveguides Composed of Metafilms/Metasurfaces: The Two-Dimensional Equivalent of Metamaterials", IEEE Antennas and Wireless Propagation Letters, Mar. 24, 2009, vol. 8, pp. 525-529, DOI: 10.1109/LAWP.2009.2018123.

Hosseini et al., "Design of a single-feed 60 GHz planar metallic Fabry-Perot cavity antenna with 20 dB gain", 2009 IEEE International Workshop on Antenna Technology, Mar. 2-4, 2009, Santa Monica, CA, USA, pp. 1-4, DOI: 10.1109/IWAT.2009.4906979.

Kildal, "Artificially soft and hard surfaces in electromagnetics", IEEE Transactions on Antennas and Propagation, Oct. 1990, vol. 38, No. 10, pp. 1537-1544, DOI: 10.1109/8.59765.

Pozar, David M., "Microwave Engineering", JohnWiley & Sons, Inc., Third Edition, 2005.

Trentini, "Partially reflecting sheet arrays", IRE Transactions on Antennas and Propagation, Oct. 1956, vol. 4, No. 4 , pp. 666-671, DOI: 10.1109/TAP.1956.1144455.

Zhao et al., "2-D periodic leaky-wave Antennas-part II: slot design", IEEE Transactions on Antennas and Propagation, Nov. 7, 2005, vol. 53, No. 11, pp. 3515-3524, DOI: 10.1109/TAP.2005.858580.

Zhao et al., "Simple CAD model for a dielectric leaky-wave antenna", IEEE Antennas and Wireless Propagation Letters, 2004, vol. 3, pp. 243-245, DOI: 10.1109/LAWP.2004.837513.

* cited by examiner

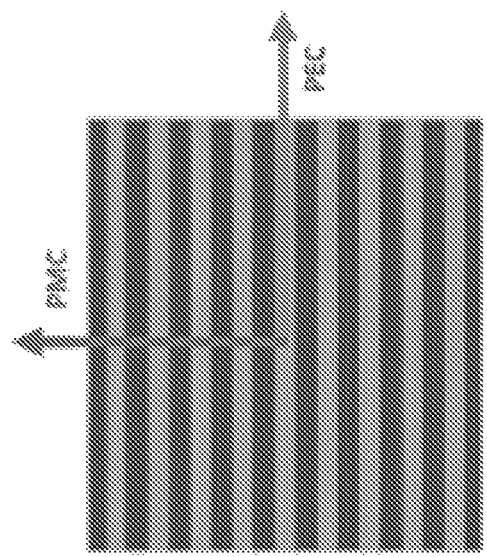
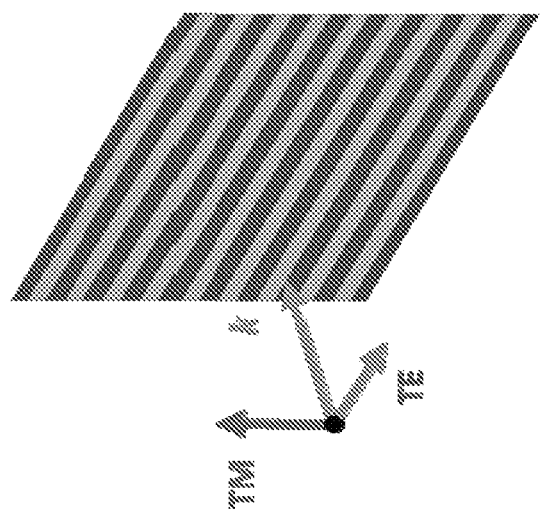
FIG. 2B
FIG. 2A

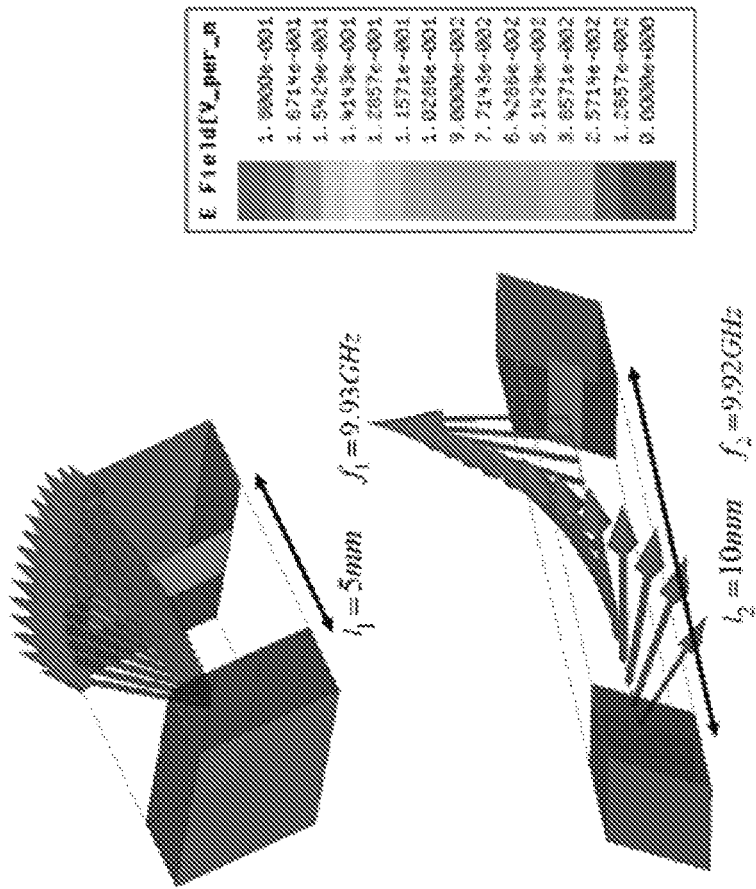
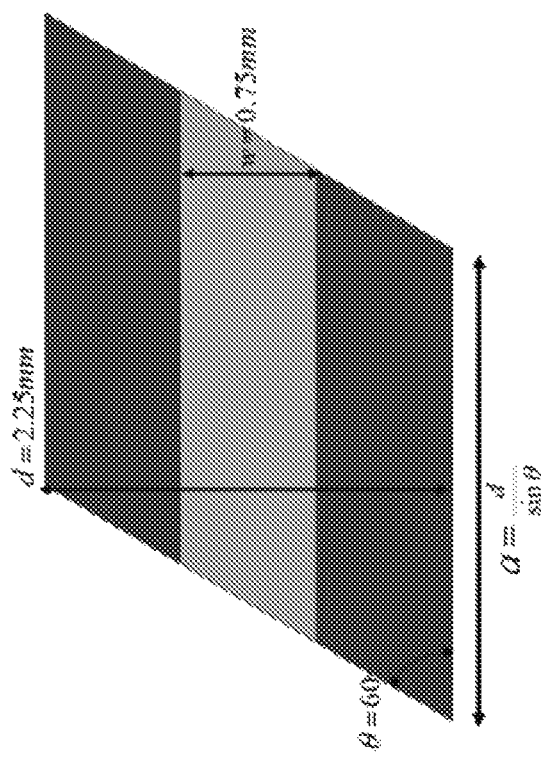
FIG. 3B
FIG. 3C
FIG. 3A

POLARIZATION STANDING WAVE CAVITY ASSISTED BY ANISOTROPIC STRUCTURES

RELATED APPLICATIONS

The present application claims priority under 35 U.S.C. 119(e) to U.S. Provisional Patent Application Ser. No. 62/514,620 filed Jun. 2, 2017 and to U.S. Provisional Patent Application Ser. No. 62/677,501 filed May 29, 2018, the disclosures of which are incorporated herein by reference in their entireties.

GOVERNMENT SPONSORSHIP

This invention was made with government support under Grant Number 1610892, awarded by the National Science Foundation. The government has certain rights in the invention.

FIELD OF THE INVENTION

Systems and methods in accordance with various embodiments of the invention relate to waveguide cavities and more specifically to polarization standing wave cavities assisted by anisotropic structures.

BACKGROUND OF THE INVENTION

Conventional resonators for microwave mainly include waveguide resonators, microstrip resonators, dielectric resonators, and substrate integrated waveguide (SIW) resonators. For these cavities, the tunability is typically achieved by varactors and switches. Conventional cavities for Terahertz and optics are mainly implemented by two facing plane or spherical mirrors. The simplest of these is the plane-parallel or Fabry-Perot (F-P) cavity, consisting of two opposing flat mirrors. For these cavities, tunability is typically achieved by replacing one of the mirrors with auto-collimation structures, for example, with autocollimation gratings.

SUMMARY OF THE INVENTION

Waveguides in accordance with embodiments of the invention are disclosed. In one embodiment, a dual-mode circular waveguide includes a cavity, a first end wall including a first handedness-preserving metasurface positioned at a first end of the cavity, and a second end wall including a second handedness-preserving metasurface positioned at a second end of the cavity.

In a further embodiment, the first and second handedness-preserving metasurfaces are anisotropic metasurfaces.

In another embodiment, the first and second handedness-preserving metasurfaces are corrugated metal.

BRIEF DESCRIPTION OF THE DRAWINGS

FIGS. 2A and 2B illustrate a configuration of a PEC-PMC anisotropic surface for a PSW cavity in accordance with embodiments of the invention.

FIGS. 3A, 3B, and 3C illustrate simulation results where two surfaces have arbitrary rotation angle in accordance with embodiments of the invention.

DETAILED DISCLOSURE OF THE INVENTION

Figure 1B:
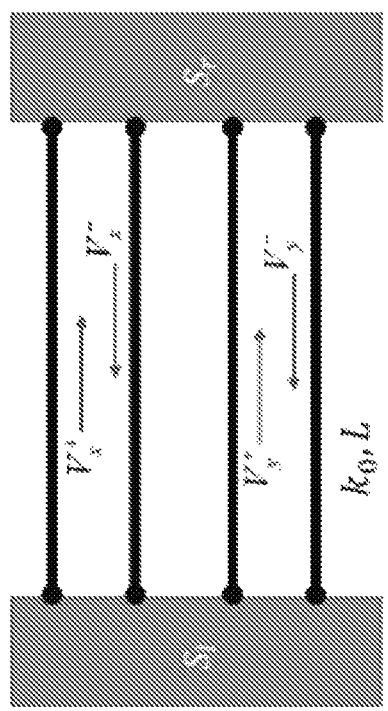
FIG. 1B conceptually illustrates a transmission line model of the cavity of FIG. 1a in accordance with embodiments of the invention.

Turning now to the drawings, polarization standing wave cavities assisted by anisotropic structures in accordance with embodiments of the invention are disclosed.

Conventional resonators for microwave mainly include waveguide resonators, microstrip resonators, dielectric resonators, and substrate integrated waveguide (SIW) resonators. For these cavities, the tunability is typically achieved by varactors and switches. Conventional cavities for Terahertz and optics are mainly implemented by two facing plane or spherical mirrors. The simplest of these is the plane-parallel or Fabry-Perot (F-P) cavity, consisting of two opposing flat mirrors. For these cavities, tunability is typically achieved by replacing one of the mirrors with auto-collimation structures, for example, with autocollimation gratings.

Depending on the boundary conditions, the characteristic dimension of the resonators are multiple half wavelengths or quarter wavelengths. For microstrip resonators, the RF power handling is low, and the quality factor is typically around 100. For SIW cavities, the quality factor is typically a few hundred. To tune the resonance frequency of microstrip resonator or SIW resonators, varactors are often applied to provide variable capacitance. For waveguide cavities and dielectric resonators, quality factor is often about a few thousand. However, the implementation of tunability is often very difficult and their size is bulky. For THz and Optical cavities, the tunability is usually achieved by autocollimation components.

The conventional standing wave, whether it is the result of two counter propagating linearly polarized (LP) waves or two circularly polarized (CP) waves of opposite handedness, is commonly understood to must have nodes and anti-nodes. Resonant cavities can be formed by placing short (electric wall) at the nodes and open (magnetic wall) at the anti-nodes, thus requiring the cavity length to be integer multiples of quarter wavelength. However, a chiral handedness preserving mirror may help to break this rule for CP plane-waves (PWs). While a normal mirror will reverse the handedness of a CP incident PW upon reflection, a chiral mirror preserves the handed-ness. The superposition of two counter-propagating CP PWs with the same handedness results in a constant amplitude standing wave, termed as the polarization standing wave (PSW). With the absence of nodes and anti-nodes in PSW, the cavity length can be arbitrarily reduced, as long as the two end walls are appropriately chosen. This is similar to zeroth order composite Right/Left-Handed (CRLH) resonator.

The polarization standing wave phenomena can be utilized in a resonant cavity in accordance with embodiments of the invention. Counter propagating circularly polarized waves with the same handedness can form a constant amplitude standing wave with a helical waveform. Resonance can be formed by waves bouncing between two handedness preserving mirrors, such as, but not limited to, anisotropic metasurfaces, placed at the cavity ends. The standing waves resulting from such reflections typically do not have nodes and antinodes. A theoretical solution for the criterion of the standing wave is discussed below and demonstrated in a waveguide cavity. The solution is also demonstrated in an F-P cavity which can be suitable for THz and optics. Such cavity can provide high power handling, high Q, and easy tunability.

Described below in accordance with embodiments of the invention are a novel handedness preserving mirror with a simple anisotropic perfect electric conductor (PEC)—perfect magnetic conductor (PMC) metasurface. Based on two of such metasurfaces, a theoretic solution to the resonance condition for plane-wave PSWs are presented. The results are then extended to guided waves. The PEC-PMC metasurfaces can be placed as two end walls of a circular waveguide cavity, forming a resonance condition not observed before in such waveguide cavities. The handedness preserving reflectors can be realized with anisotropic metasurfaces with relative rotation. The surfaces can provide a perfect electric conductor (PEC) type reflection for one field polarization, while providing a perfect magnetic conductor (PMC) behavior for the orthogonal field polarization. Thus the term PEC-PMC metasurface can be used for these boundaries. By proper relative rotation of axis between the two anisotropic end walls, any cavity length can resonate at the desired frequency. The dispersion of the metasurface is also analyzed and discussed below to investigate the tunability of the resonance frequency.

The concept is then extended to guided waves and waveguide resonators. The PEC-PMC metasurfaces can be placed as two end walls of a circular waveguide cavity. This demonstrates a new resonance condition in a dual-mode circular waveguide cavity, which was not observed before in such structures. The structures described here in accordance with embodiments of the invention can provide an easier and more robust tuning mechanism and can provide control over the direction of the output beam's polarization.

Polarization Standing Wave Cavities

A handedness preserving mirror can be implemented with a basic property of CP plane waves. A circularly polarized (CP) plane-wave (PW) can be decomposed into two equal amplitude orthogonal linearly polarized (LP) PWs. These two LP components have a ±90° phase difference (in phasor form), where the sign determines the handedness based on the propagation direction. An electric wall, such as a metal reflector, reverses the handedness of an incident CP PW upon reflection, as it is isotropic and provides the same $\pi$ reflection phase for the two LP wave components. Other isotropic surfaces can have similar behavior.

An anisotropic PEC-PMC wall however can preserve handedness upon reflection. CP waves with electric field polarized along the PEC axis, undergo a $\pi$ radians reflection phase. This is while the other orthogonal polarization sees a PMC, and undergoes a 0 radian reflection phase. Upon reflection of a CP wave from such a surface, the sign of the phase difference is reversed and thus the handedness is preserved. Other anisotropic surfaces, as long as they can provide a $\pi$ radian reflection phase difference between the two orthogonal axes, can also act as handedness preserving mirror.

Various embodiments of the invention may utilize end walls that are made of a periodic surface that can preserve the handedness of the incident CP wave. Additional structures that may be utilized can be periodic in two dimensions with posts. For example, metal plates can be used with two different types of dielectric rods alternating. In several embodiments, one of the dielectrics can be air (e.g., air gaps in between the first dielectric). In additional embodiments, the end walls utilize a corrugated metal structure, which can have square or triangular profile channels. One skilled in the art will recognize that similar materials that preserve handedness of a reflected wave may be utilized in accordance with embodiments of the invention.

Figure 1A:
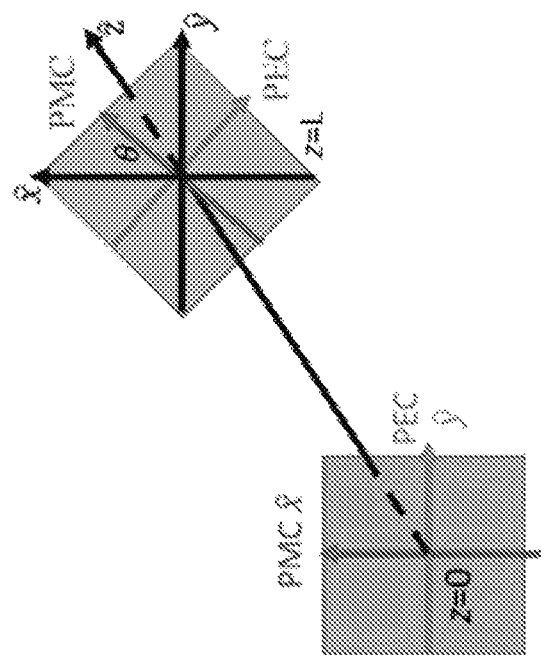
FIG. 1A illustrates a configuration of a polarization standing wave (PSW) cavity in accordance with embodiments of the invention.

In many embodiments, a polarization standing wave (PSW) cavity is based on a polarization standing wave formed by the counter propagating circularly polarized waves with the same handedness. A PSW typically has constant amplitude standing wave with a helical waveform. In many embodiments of the invention, the PSW mode is supported by placing two handedness preserving mirrors at a certain distance with a certain relative rotation angle, as the end walls of a cavity as shown in FIG. 1a. The axes of the wall at z=L are rotated by $\theta$ with respect to the first wall. Here, the PEC-PMC (perfect electrical conductor—perfect magnetic conductor) anisotropic metasurface is used as an example for handedness preserving mirrors. This is a scheme for a Fabry-Perot (F-P) cavity of PSW mode in accordance with various embodiments of the invention. FIG. 1b shows an equivalent transmission line model of the cavity. The two pair of transmission lines represent the two polarizations. The reflecting metasurfaces can be seen as equivalent to two-port networks characterized by a 2×2 S-matrix.

In the embodiment illustrated in FIG. 1a, the cavity axis, and thus direction of wave propagation is the z-axis, and the electric field can take any polarization in the x-y plane. One anisotropic end-wall is placed at z=0 whose PMC axis is parallel to the x-axis while the PEC axis is parallel to the y-axis. The other end-wall is placed at z=L. The PEC-PMC axes of the second wall are tilted by an angle $\theta$ around the z-axis with respect to the first metasurface. Since the PEC-PMC metasurface is rotationally symmetric around the z-axis by every 180°, the value of the tilt angle $\theta$ can only be $0 \leq \theta < \pi$. A 1D Fabry-Perot type cavity can be formed between these PEC-PMC end-walls, which are infinite in size in the x-y plane. The eigen-solutions to resonances in such a 1D cavity (along z) can be found, where the two surfaces can have arbitrary rotation with respect to each other.

According to a theoretical solution discussed below, the resonance condition for the PSW mode can be expressed as $k_0 l \pm \theta = n\pi$, where $k_0$ is the wave number, $l$ is the cavity length, and $\theta$ is the relative rotation angle between two end walls. A PEC-PMC anisotropic metasurface is designed at 10 GHz as an example to act as the handedness preserving mirror. The configuration of a surface that may be utilized in accordance with embodiments of the invention is shown in FIGS. 2a and 2b. In many embodiments of the invention, a PEC-PMC can be constructed by putting periodic metal straps on a metal backed dielectric. Sub-wavelength periodic parallel metal traces on a grounded substrate may respond differently to orthogonal polarizations. If the incident E field is parallel to the traces, the surface behaves as a PEC. This is while if the E field is perpendicular to the metal traces, it acts as an impedance surface whose refection angle can be designed as PMC. Thus an anisotropic PEC-PMC can be found by simply designing the impedance surface's reflection angle to be 0 radians.

Theoretic Solution to the Resonance

The allowable resonant modes in such a structure may be understood from two perspectives. First, a field analysis approach can be used. To find the eigen solution to the resonance in a dual-polarization cavity, the boundary condition at the PEC-PMC anisotropic metasurface such as that illustrated in FIG. 1a can be utilized. Assume that the PEC axis boundary condition requires that the total tangential E field to be 0 along that axis, while the PMC axis boundary condition requires that the maximum tangential E field at the surface to be in this direction. In the case where the anisotropic surface is designed to PEC-PMC, the boundary condition can be written as:

$$P\hat{E}C \cdot \vec{E}_t = 0 \quad (1)$$

$$P\hat{M}C \times \vec{E}_t = 0 \quad (2)$$

As the PEC axis is orthogonal to the PMC axis, equations (1) and (2) are equivalent to each other. In other words, at the surface, the total tangential E field must only exist along the PMC axis, which makes the E field perpendicular to the PEC axis.

Now consider a cavity as shown in FIG. 1a. Two PEC-PMC anisotropic surfaces are located at z=0 and z=L. At z=0, the PEC axis of the surface is along the x direction. At z=L, the metasurface is rotated around the z-axis and the angle between the PEC axis and the x-axis is $\theta (0 \leq \theta < \pi)$. Assume that both polarizations can exist in the cavity, namely the x and y polarization. The general field inside the cavity can be given by $$\vec{E}_x = \hat{x}(Ae^{-jk_0z} + Be^{+jk_0z}), \quad (3)$$

$$\vec{E}_y = \hat{y}(Ce^{-jk_0z} + De^{+jk_0z}), \quad (4)$$

where A, B, C, D are the complex amplitudes of the corresponding waves. Applying boundary condition (1) to the field at z=0 (i.e., single reflection from the left wall), the relationship between the coefficients are established as $$A+B=0, C=D \quad (5)$$

Thus, the field in the cavity can be rewritten as $$\vec{E}_x = -2jA \sin(k_0z)\hat{x} \quad (6)$$

$$\vec{E}_y = 2C \cos(k_0z)\hat{y} \quad (7)$$

At z=L, due to the rotation of the surface, the direction of the PEC axis is given by $$P\hat{E}C = \hat{x} \cos\theta + \hat{y} \sin\theta \quad (8)$$

Applying the boundary condition (1) at z=L obtains $$C \cos(k_0L)\sin\theta = jA \sin(k_0L)\cos(\theta) \quad (9)$$

Equation (9) provides a general solution to the resonance in this cavity. It can be noticed that if $\theta=0$ or $\pi/2$, the field of the two polarizations would decouple and the solution degenerates into a conventional dual-mode resonance whose resonance conditions are $k_0L=n\pi$ and $k_0L=n\pi+\pi/2$ respectively.

When $\theta=0$, $\sin\theta=0$, and the left-hand side of (9) equals to zero. To satisfy the right-hand side of (9), $$\sin(k_0L)=0 \Rightarrow k_0L=n\pi, (n=0,1,2,\ldots) \quad (10)$$

When $\theta=\pi/2$, $\cos\theta=0$ and the right-hand side of (10) equals to zero. In this scenario, $$\cos(k_0L) = 0 \Rightarrow k_0L = n\pi + \frac{\pi}{2}, (n=0, 1, 2, \ldots) \quad (11)$$

It can be seen that in either of the two cases, the solution can be obtained by letting one side of (9) equal to zero by using the rotation angle, and then equate the other side to zero by imposing a condition on the length. In both scenarios, the two polarizations would decouple, and waves along each polarization would resonate independently. In other words, there is no connection between the two polarizations.

These two cases correspond to the classic resonances in a 1D cavity. For each polarization, the case of $\theta=0$, corresponds to the case where either both ends of the cavity are short (PEC) or both are open (PMC). The case of $\theta=\pi/2$ corresponds to the so called half-mode resonances, where one cavity end is PEC and the other is PMC for one polarization, and vice versa for the other polarization. These modes also resonate on their own independently from the other polarization.

Now consider the case where $\theta$ takes any other value aside from 0, $\pi$. In such a scenario, the field of the two polarizations cannot be decoupled and $\theta$ cannot be eliminated. If $\theta$ takes any other value aside from 0, $\pi$, the field of the two polarizations cannot be decoupled and $\theta$ cannot be eliminated. Since CP waves are of prime interest here, without losing generality, let $$A = \pm jC \quad (12)$$

The sign indicates the handedness of the CP wave. Such a condition can be seen as assuming that the wave is CP type, where one polarization is equal and in quadrature phase with respect to the other polarization. Using (12) in (9), the solution can be reduced to $$\sin(k_0L \pm \theta) = 0 \quad (13)$$

The solution to (13) is a new resonance condition $$k_0L \pm \theta = n\pi, (n=0,1,2,\ldots) \quad (14)$$

It can be observed that this resonance condition is not only dependent on $k_0L$ but also on values of $\theta$ between 0, $\pi$. The relationship also depends on the handedness of the CP wave. It also suggests that the resonance frequency can be potentially tuned by rotating the surface instead of changing the cavity length. Higher order resonances of order n>0 are also possible.

Further, if (12) is used in (6) and (7), the total field in the cavity can be given as $$\vec{E}_t = 2C(\pm \sin(k_0z)\hat{x} + \cos(k_0z)\hat{y}) \quad (15)$$

and thus $$|E_t(z)| = 2C \quad (16)$$

This shows that the amplitude of the total E field is constant along the z-direction and no nodes and anti-nodes are present. Also, it can be noticed that the direction of the E field at any given z can be given by $$\text{Angle} = \tan^{-1}\left(\frac{E_x}{E_y}\right) = \pm k_0z \quad (17)$$

which has a linear relationship with z. This shows that the tip of the E field vector follows a helical path around z. In addition, given the frequency, the direction of the E field is only dependent on z. The feature of this field fits the PSW profile.

The above approach provides an efficient way for the analytical solution to the resonance condition of PSW. However, the solution is not exclusive. The solution manually imposed (12) and reached a solution. Nevertheless, there might be other modes aside from the aforementioned three types of modes based on the different relationship of A and C in (9). For instance, assume that there is also a magnitude difference between A and C $$A = \pm jCM \quad (18)$$

Now (9) can be rewritten as, $$\tan(k_0 L) = \pm M \tan \theta \quad (19)$$

Equation (19) leads to a new resonance condition where the magnitude ratio between each polarization also comes into the picture. In this scenario, the field is like PSW except that it has an elliptically polarized nature. However, a few problems can arise from this result. The first is that this mode typically cannot be captured by full wave simulation tools, which make its existence questionable. The second is that for a given configuration of the cavity and a given frequency, there would be infinitely many modes due to infinitely many possible different magnitude ratios between A and C, which seems impossible. In addition, the field perspective is not able to analyze the cases other than the PEC-PMC anisotropic surface scenario. The answer to these questions can be easily seen from a circuit perspective.

Since the resonance is caused by the PWs bouncing back and forth between the two walls in this 1D propagation problem, it is natural to take the x and y polarization LP waves as a set of eigen-polarizations for the 1D propagation. Any PWs that propagates along z can therefore be constructed as a linear superposition of the two eigen-polarizations. Note that there is no energy coupling between the two eigen polarization PWs in free space (unless this region is filled with a chiral material itself, which is not the case here).

With such perspective, FIG. 1b shows a network representation of the scenario at hand. The free-space propagation path between the two end walls is equivalent to a two transmission-line network. Each transmission-line corresponds to one eigen-polarization with a propagation constant equal to $k_0$ for free space. The end walls are modeled as four-port networks responsible for reflections and transmissions on both polarizations. In the most general case, the matrix representation of scattering from a discontinuity in the propagation path of a two-transmission line system can be given as:

$$\begin{bmatrix} b_{1x} \\ b_{1y} \\ b_{2x} \\ b_{2y} \end{bmatrix} = [S] \begin{bmatrix} a_{1x} \\ a_{1y} \\ a_{2x} \\ a_{2y} \end{bmatrix} \quad (20)$$

where $$S = \begin{pmatrix} s_{1x1x} & s_{1x1y} & s_{1x2x} & s_{1x2y} \\ s_{1y1x} & s_{1y1y} & s_{1y2x} & s_{1y2y} \\ s_{2x1x} & s_{2x1y} & s_{2x2x} & s_{2x2y} \\ s_{2y1x} & s_{2y1y} & s_{2y2x} & s_{2y2y} \end{pmatrix}$$

Here 1x and 1y notations denote the x- and y-polarization scatterings on the left side of the discontinuity, and 2x and 2y for the right side. In the particular discontinuity of FIG. 1b, there are only reflections and no transmission. Thus, only one side of the surface is of interest. The reflection scattering behavior of each surface can then reduce to a two-port network where only the reflected fields on the same side are of interest:

$$\begin{bmatrix} V_x^- \\ V_y^- \end{bmatrix} = [S] \begin{bmatrix} V_x^+ \\ V_y^+ \end{bmatrix} \quad (21)$$

$$S = \begin{pmatrix} s_{xx} & s_{xy} \\ s_{yx} & s_{yy} \end{pmatrix}$$

The equivalent transmission-line model of the dual-polarized cavity and the reflection discontinuities are given in FIG. 1b. Since the circuit model can describe the end-walls by using the scattering matrix, the deduction does not require the end-wall to be PEC-PMC anisotropic surface. The reflector can be any handedness preserving mirror for this problem. The scattering matrix describing this reflector can be expressed as $$S_l = \begin{pmatrix} e^{j\phi} & 0 \\ 0 & -e^{j\phi} \end{pmatrix} \quad (22)$$

When $\phi=0$, the end-well becomes PEC-PMC anisotropic surface.

The scattering matrix for the right wall however is not as straightforward. The principal axes of this wall have a rotation around the z-axis, by an amount $\theta$. The scattering matrix of the right wall ($S_r$), defined in the x-y coordinate system, can be obtained by the coordinate transformation of $S_l$ using the rotation matrix $R(\theta)$:

$$S_r = R(\theta) S_l R(\theta)^T = \begin{pmatrix} e^{j\phi}\cos 2\theta & e^{j\phi}\sin 2\theta \\ e^{j\phi}\sin 2\theta & -e^{j\phi}\cos 2\theta \end{pmatrix} \quad (23)$$

where $$R(\theta) = \begin{pmatrix} \cos\theta & -\sin\theta \\ \sin\theta & \cos\theta \end{pmatrix} \quad (24)$$

Now consider the resonance path. The plane waves in +z direction from z=0 reach z=L and are reflected by the second end-wall, then travel in −z direction, are reflected by the first end-wall at z=0, and reach their initial position. The resonance requires that the wave and all its derivatives be continuous after this one round-trip. Letting $E_1$ and $E_2$ to represent the initial complex amplitude of the two eigen-polarization PWs, the described resonance roundtrip can be written in matrix form as:

$$\begin{pmatrix} e^{j\phi} & 0 \\ 0 & -e^{j\phi} \end{pmatrix} \begin{pmatrix} e^{j\phi}\cos 2\theta & e^{j\phi}\sin 2\theta \\ e^{j\phi}\sin 2\theta & -e^{j\phi}\cos 2\theta \end{pmatrix} \begin{pmatrix} E_1 \\ E_2 \end{pmatrix} e^{-2jk_0 l} = \begin{pmatrix} E_1 \\ E_2 \end{pmatrix} e^{j2m\pi}, \quad (25)$$

$$(m = 0, 1, 2, \ldots)$$

Rearranging equation (23) provides $$\begin{pmatrix} \cos 2\theta & \sin 2\theta \\ -\sin 2\theta & \cos 2\theta \end{pmatrix} \begin{pmatrix} E_1 \\ E_2 \end{pmatrix} = e^{j2(m\pi + k_0 l - \phi)} \begin{pmatrix} E_1 \\ E_2 \end{pmatrix} \quad (26)$$

Denote the left-most matrix of (24) as A. It can be observed that $e^{j2(m\pi+k_0 l)}$ is the eigenvalue, and $(E_1, E_2)^T$ is the eigenvector of A.

When θ=0, A is an identity matrix whose eigenvalues are $\lambda_1=\lambda_2=1$. In this case, $$e^{j2(n\pi+k_0l-\phi)}=1 \Rightarrow k_0l=n\pi+\phi, (n=0,1,2,\ldots). \tag{27}$$

When $$\theta = \frac{\pi}{2},$$

A is again an identity matrix with a minus sign. Its eigenvalues are $\lambda_1=\lambda_2=-1$. In this scenario, $$e^{j2(n\pi+k_0l-\phi)}=-1 \Rightarrow k_0l = n\pi + \frac{\pi}{2}+\phi, (n=0,1,2,\ldots). \tag{28}$$

The eigenvectors for θ=0 and $$\theta = \frac{\pi}{2}$$

are $x_1=(1,0)^T$ and $x_2=(0,1)^T$ respectively. These eigenvectors indicate that $E_1$ and $E_2$ are independent, or in other words the x-polarized or the y-polarized field distributions are involved for each resonance. These two resonances correspond to the classic resonant modes described earlier and agree with the results in (10) and (11) from the field analysis when φ=0.

However, A is no longer an identity matrix when θ is any other value. The eigenvectors of A in general can be obtained as $$x = \begin{pmatrix} \frac{\cos2\theta \mp 2j\sin\theta\cos\theta - \cos2\theta}{\sin2\theta} \\ 1 \end{pmatrix} = \begin{pmatrix} \frac{\mp 2j\sin\theta\cos\theta}{\sin2\theta} \\ 1 \end{pmatrix} \tag{29}$$

which leads to two fixed eigen-vectors:

$$x_1 = \begin{pmatrix} j \\ 1 \end{pmatrix} \text{ and } x_2 = \begin{pmatrix} -j \\ 1 \end{pmatrix}. \tag{30}$$

This shows that the eigenvectors are independent of the tilt angle θ. More importantly, by using (29), the relationship of $E_1$ and $E_2$ can be obtained as $$E_1 = \pm jE_2. \tag{31}$$

Eq. (30) reveals the circularly polarized nature of the waves inside the cavity at resonance. The sign also indicates the handedness of the CP PWs. In addition, the CP nature is independent of the tilt angle θ. More importantly there have not been imposed any presumptions on the PWs in the cavity, yet the CP PWs revealed themselves as the only eigen-solutions for resonance as long as $\theta \neq \{\pi, \pi/2\}$. The possibility of elliptical PSW is ruled out by this transmission line argument.

By solving the matrix, the eigenvalues are $\lambda_1 = e^{-j2\theta}$, $\lambda_2 = e^{+j2\theta}$. In this case, $$e^{j2(n\pi+k_0l-\phi)}=\lambda=e^{\mp j2\theta} \Rightarrow k_0l=n\pi+\phi \mp \theta, (n=0,1,2,\ldots) \tag{32}$$

which agrees with (14) when φ=0.

The total field inside the cavity can be obtained by superposition of the two counter propagating CP PWs of same handedness:

$$\vec{E_t}(z) = \tag{33}$$

$$\vec{E_+}(z) + \vec{E_-}(z) = \begin{pmatrix} E_0 \\ \pm jE_0 \end{pmatrix} e^{-jk_0z} + S_1^{-1}\begin{pmatrix} E_0 \\ \pm jE_0 \end{pmatrix} e^{+jk_0z} = \begin{pmatrix} E_0\cos k_0z \\ \mp E_0 \sin k_0 z \end{pmatrix}$$

which agrees with (15) when φ=0. The presence of the off-diagonal elements in $S_r$ and thus in A, cause the coupling between the two eigen-polarizations and links them at the two polarizations at the cavity ends, to form the new resonance.

In reality, the surfaces realizing the handedness preserving boundaries, are dispersive over frequency (their reflection phase on the two axes does not necessarily keep the same difference as the frequency changes). When the tuning of the resonance frequency is desired, the dispersion of these metasurfaces is therefore required. The transmission line model can accommodate this. For a PEC-PMC metasurface as example, the wave will see PEC for one polarization for all frequencies. While the wave with the other polarization will see PMC at center frequency and deviate on other frequencies. Thus, the scattering matrix can be modified as $$S_l = \begin{pmatrix} e^{j\phi} & 0 \\ 0 & -1 \end{pmatrix}, \tag{34}$$

where φ is the reflection angle caused by the dispersion which is a function of frequency for a given metasurface. The scattering matrix for the second wall can also be obtained by applying the rotation matrix $$S_r = R(\theta)S_l R(\theta)^T = \begin{pmatrix} -\sin^2\theta + e^{j\phi}\cos^2\theta & \frac{\sin 2\theta(1+e^{j\phi})}{2} \\ \frac{\sin 2\theta(1+e^{j\phi})}{2} & -\cos^2\theta + e^{j\phi}\sin^2\theta \end{pmatrix}. \tag{35}$$

By using the same procedure as in previous sections, the final equation can be obtained $$\begin{pmatrix} -e^{j\phi}(\sin^2\theta - e^{j\phi}\cos^2\theta) & \frac{\sin 2\theta e^{j\phi}(1+e^{j\phi})}{2} \\ -\frac{\sin 2\theta(1+e^{j\phi})}{2} & \cos^2\theta - e^{j\phi}\sin^2\theta \end{pmatrix}\begin{pmatrix} E_1 \\ E_2 \end{pmatrix} = \tag{36}$$

$$e^{j2(n\pi+k_0l)}\begin{pmatrix} E_1 \\ E_2 \end{pmatrix}.$$

This is again an eigenvalue problem where the eigenvalues can be calculated $$\lambda = e^{j\phi}(\cos^2\theta + \cos\phi\cos^2\theta - 1) \mp \tag{37}$$

$$\cos\frac{\phi}{2}e^{j\phi}\cos\theta\sqrt{2(\cos^2\theta + \cos^2\theta\cos\phi - 2)}.$$

Thus the resonance condition can be numerically written as $$\lambda - e^{j2k_0l} = 0. \tag{38}$$

Equation (5) is a function of cavity length l, the tile angle θ and resonance frequency f. The analytical solution is not obvious, yet the graphical method can be employed by plotting the curve where $$|\lambda - e^{j2k_0 l}| = 0. \qquad (39)$$

From (39), the resonance frequency can be obtained once the cavity length and the rotation angle is given. It would allow the precise tuning over a large frequency band with realistic metasurface designs.

Simulations in Circular Waveguide Cavity

A set of eigenmode simulations can be performed to demonstrate the PSW mode in an F-P cavity designed in accordance with embodiments of the invention at 10 GHz. Simulation results where two surfaces have arbitrary rotation angle are shown in FIGS. 3a, 3b, and 3c. In FIG. 3a, a rhombus unit cell of metasurfaces forms an F-P cavity rotation. FIG. 3b shows the rotation angle between the two end walls where $\theta_1 = 60°$. FIG. 3c shows the rotation angle between the two end walls where $\theta_2 = 120°$.

The unicell is modified to represent the rotation of the infinite big end wall of the F-P cavity. The rotation angle and the cavity length can be chosen following the resonance condition provided. It can be seen that the resonances happen at the designed frequency and with the PSW wave form. The cavity size is greatly reduced and the resonance frequency can be potentially tuned by rotating the end walls.

Figure 4:
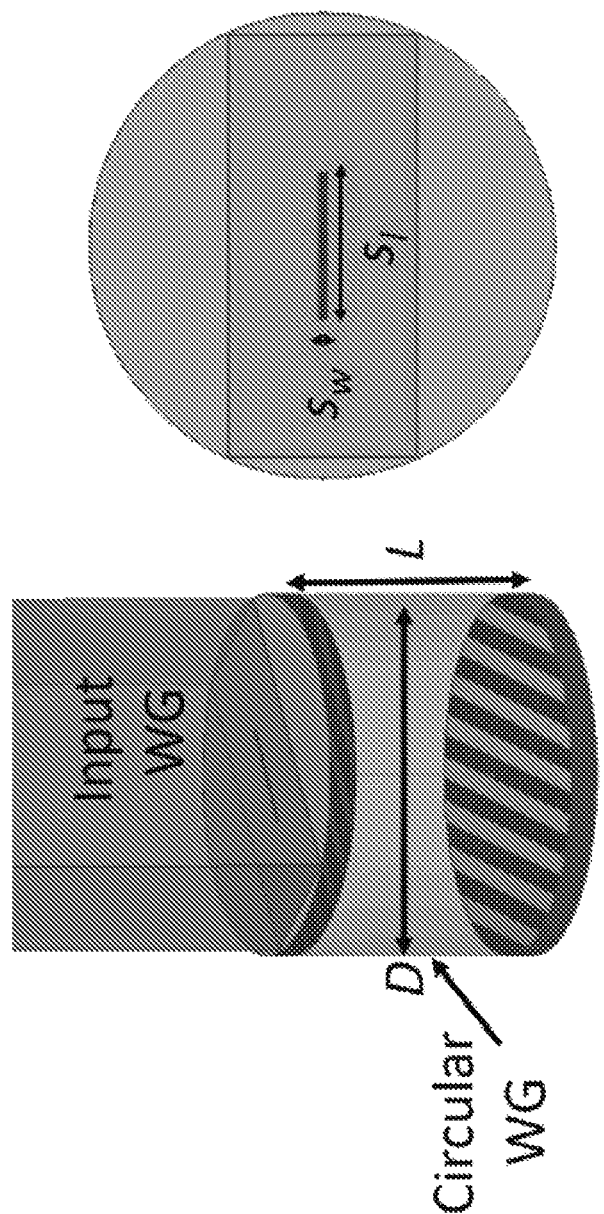
FIG. 4 illustrates PSW mode in a circularly waveguide cavity in accordance with embodiments of the invention.

PSW mode in a dual-mode circularly waveguide cavity in accordance with embodiments of the invention can also be demonstrated at 10 GHz as shown in FIG. 4. In the embodiment illustrated in FIG. 4, the circular waveguide is made of a copper tube with an inner diameter D=25.27 mm. Two PEC-PMC anisotropic metasurfaces using a design as shown in FIG. 2B are placed at the two ends of the waveguide. The surfaces are implemented with Rogers RT/Duroid® 6010LM with dielectric constant εr=10.2 at 10 GHz and thickness h=1.91 mm. A relative rotation angle θ=135° is set between the two surfaces. The cavity length can be calculated by the resonance condition provided. The wavenumber β here can be replaced with the guided wavenumber in the cavity. The cavity is excited by, for example, a standard WR-90 rectangular waveguide (WG) through a coupling slot with dimensions $s_l$=8 mm by $s_w$=0.5 mm. The coupling slot is etched on the ground back of the metasurface that joins the input WR-90 WG to the cavity, and also acts as polarizing the field along the particular PMC direction.

While this scenario does not deal with CP plane waves, there are still two orthogonal polarization of $TE_{11}$ modes, which can be made to have ±90° phase difference, and represent a similar type of handed propagation. This is particularly applicable, to the center axis of the guide along z-axis. The guided wave number $k_0$ for $TE_{11}$ mode in this waveguide can be given as $$k_0 = \sqrt{k^2 - \left(\frac{\chi'_{11}}{D/2}\right)} \qquad (40)$$

To design the n=0 order resonance frequency to be at 10 GHz for a rotation angle of θ=135°, the cavity length L can be calculated by using (14)

$$L = \frac{\theta}{k_0} = 15.84 \text{ mm} \qquad (41)$$

θ=135° is chosen in a prototype in accordance with embodiments of the invention, instead of 45°, to have a larger device that can be built and measured easily. From (14), if θ=45°, the cavity length L would be 5.28 mm. It can be noted that the cavity length does not correspond to any resonant orders of a conventional $TE_{11}$ dual-mode waveguide cavity of the same dimensions. The rotation angle can be fixed for ease of demonstration, but implementing a mechanism that that rotates one of the metasurfaces can tune the resonance.

Figure 5:
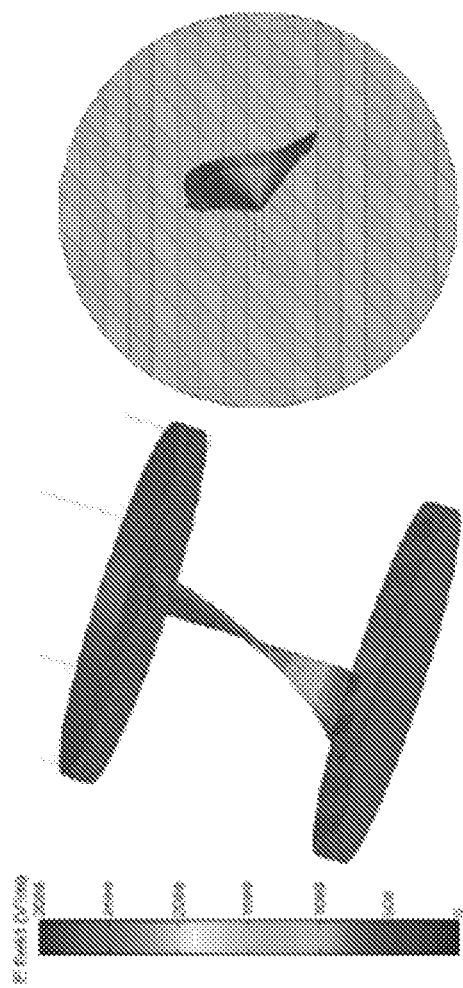
FIG. 5 illustrates a field along the center of a waveguide cavity at resonance in accordance with embodiments of the invention.

The resonant structure is 3D, rather than the one-dimensional plane wave discussed further above. Therefore, full-wave simulations can be performed to verify that the resonance is the one theorized. The field inside the circular cavity along the center z-axis is presented in FIG. 5 for the resonance point. The E field vector follows a helical path with about 135° total rotation, and relatively uniform amplitude. Closer observation shows that the field at the two end boundaries are aligned with the PMC axis. These features meet the desired field profile described in (15) and (17).

Figure 6:
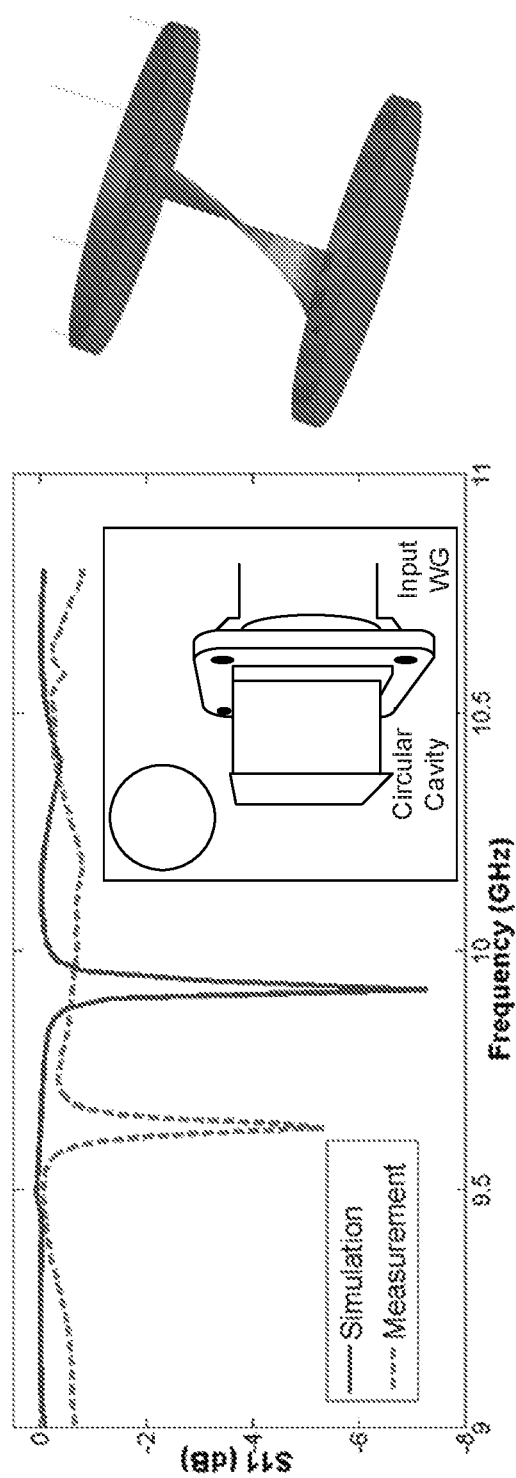
FIG. 6 illustrates measurement results of a simulation of a PSW cavity in accordance with embodiments of the invention.

Measurement results and the field distribution at resonance of the cavity excited in accordance with embodiments of the invention are illustrated in FIG. 6 as the single port S-parameter of both simulation and measurement. The dip in reflection shows the existence of the new resonance at 9.97 GHz. This matches the theoretic prediction when using equation (14). The field distribution at resonance also shows the existence of the PSW mode. The measurement shows the resonance is at 9.63 GHz, which has a 3.4% deviation from the simulation result. This can be due to fabrication error of the metasurface boards, as well as errors in building a crude prototype, which can be improved by proper 3D machining and mechanical design. The quality factor of the cavity is 580. With other different implementations of the end walls, the quality factor can be up to 6000. Additionally, as the end wall is rotated, the resonance frequency can be potentially tuned.

Compared with a microstrip resonator or a substrate integrated waveguide (SIW) resonator, a resonator in accordance with embodiments of the invention can have a larger quality factor as high as 6000 at X band, or even more. It can also have high RF power handling. Compared with conventional waveguide cavities and dielectric resonators, the proposed structure can have the size arbitrarily reduced by proper design. The new implementation of the tunability provided by the proposed structure is much easier and thus cheaper than the conventional waveguide cavities and dielectric resonators.

In several embodiments of the invention as discussed above, an anisotropic PEC-PMC metasurface is employed to implement a handedness preserving reflection surface. Two such surfaces can be placed as end walls of a dual-mode circular waveguide, leading to a new cavity resonance. A theoretic solution to this resonance is presented above, and is experimentally demonstrated. This new resonance has potential application in tunable resonator design at mm-wave and THz region.

Additional discussion of PSW cavities in accordance with embodiments of the invention can be found in the attached Appendix, including the papers titled "A Cavity Resonance Assisted by Anisotropic Metasurfaces" and "A New Resonance in a Circular Waveguide Cavity Assisted by Anisotropic Metasurfaces" and included slides, the material of which is incorporated herewith.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A dual-mode circular waveguide comprising:
   a cavity;
   a first end wall comprising a first handedness-preserving metasurface positioned at a first end of the cavity; and
   a second end wall comprising a second handedness-preserving metasurface positioned at a second end of the cavity;
   wherein the first and second handedness-preserving metasurfaces utilize a corrugated metal structure.

2. The dual-mode circular waveguide of claim 1, wherein the first and second handedness-preserving metasurfaces are anisotropic metasurfaces.

3. The dual-mode circular waveguide of claim 1, wherein the first handedness-preserving metasurface and second handedness-preserving metasurface have triangular profile channels of the corrugated metal structure.

4. The dual-mode circular waveguide of claim 1, wherein the first handedness-preserving metasurface and second handedness-preserving metasurface are configured to construct a polarization standing wave of a particular frequency inside the cavity by determining a cavity length and rotation angle between the first end wall and second end wall.

5. The dual-mode circular waveguide of claim 1, wherein the first handedness-preserving metasurface and second handedness-preserving metasurface provide a perfect electric conductor (PEC) type reflection for a first field polarization, while providing a perfect magnetic conductor (PMC) behavior for a second field polarization orthogonal to the first field polarization.

6. The dual-mode circular waveguide of claim 1, wherein the first handedness-preserving metasurface and second handedness-preserving metasurface have square profile channels of the corrugated metal structure.

* * * * *